(12) United States Patent
Acker

(10) Patent No.: US 9,175,734 B2
(45) Date of Patent: *Nov. 3, 2015

(54) DUAL CLUTCH

(75) Inventor: Christophe Acker, Gambsheim (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 480 days.

This patent is subject to a terminal disclaimer.

(21) Appl. No.: 13/060,195

(22) PCT Filed: Aug. 3, 2009

(86) PCT No.: PCT/DE2009/001085
§ 371 (c)(1),
(2), (4) Date: Feb. 22, 2011

(87) PCT Pub. No.: WO2010/020207
PCT Pub. Date: Feb. 25, 2010

(65) Prior Publication Data
US 2011/0139565 A1     Jun. 16, 2011

(30) Foreign Application Priority Data

Aug. 22, 2008  (DE) .......................... 10 2008 039 358
Dec. 18, 2008  (DE) .......................... 10 2008 063 749

(51) Int. Cl.
*F16D 25/10* (2006.01)
*F16D 21/06* (2006.01)
*F16D 25/08* (2006.01)

(52) U.S. Cl.
CPC ............... *F16D 25/10* (2013.01); *F16D 21/06* (2013.01); *F16D 25/085* (2013.01); *F16D 25/087* (2013.01); *F16D 2021/0607* (2013.01); *F16D 2021/0669* (2013.01); *Y02T 10/76* (2013.01)

(58) Field of Classification Search
CPC ............... F16D 2021/0607; F16D 2021/0669; F16D 25/085; F16D 25/087; F16D 25/10
USPC ............ 192/48.603, 48.611, 48.616, 48.617, 192/85.52, 48.606
See application file for complete search history.

(56) References Cited

U.S. PATENT DOCUMENTS

| | | | | |
|---|---|---|---|---|
| 4,440,281 A | * | 4/1984 | Hauguth | 192/48.8 |
| 4,964,504 A | * | 10/1990 | Friedmann | 192/48.4 |
| 8,327,991 B2 | * | 12/2012 | Scholz et al. | 192/85.5 |
| 2003/0066729 A1 | * | 4/2003 | Feldhaus et al. | 192/48.8 |
| 2004/0118655 A1 | * | 6/2004 | Dogel et al. | 192/48.8 |
| 2006/0163019 A1 | * | 7/2006 | Feldhaus et al. | 192/48.8 |
| 2007/0204709 A1 | * | 9/2007 | Mesiti et al. | 74/330 |
| 2011/0114437 A1 | * | 5/2011 | Noehl | 192/48.601 |

FOREIGN PATENT DOCUMENTS

| | | |
|---|---|---|
| CN | 101225867 A | 7/2008 |
| DE | 22 61 775 A1 | 6/1974 |
| DE | 199 41 837 A1 | 2/2001 |
| EP | 0 185 176 A1 | 6/1986 |
| EP | 1 134 447 A2 | 9/2001 |
| EP | 1 302 687 A2 | 4/2003 |
| EP | 1 830 095 A1 | 9/2007 |
| FR | 2 824 370 A1 | 11/2002 |
| FR | 2 851 627 A1 | 8/2004 |
| FR | 2 886 996 A1 | 12/2006 |

* cited by examiner

*Primary Examiner* — Terry Chau
(74) *Attorney, Agent, or Firm* — Lucas & Mercanti, LLP

(57) ABSTRACT

A dual clutch which is particularly used in trucks.

12 Claims, 10 Drawing Sheets

DUAL CLUTCH

This application is a 371 of PCT/EP2009/001085 filed Aug. 3, 2009, which in turn claims the priority of DE 10 2008 039 358A filed Aug. 22, 2008 and DE 10 2008 063 749.1 filed Dec. 18, 2008, the priority of these applications is hereby claimed and these applications are incorporated by reference herein.

FIELD OF THE INVENTION

The present invention concerns a dual clutch particularly for use in trucks.

BACKGROUND OF THE INVENTION

Dual clutches are used in motor vehicles for enabling power-shifting.

A dual clutch arrangement comprising a first partial clutch K1 and a second partial clutch K2 is disclosed, for instance, in EP 0 185 176 B1.

According to the arrangement in a dual clutch of the pre-cited type, both partial clutches K1 and K2 are open in the normal state ("normally open") and are pressed to close through at least one actuating device. The actuating forces required to close the clutches are normally applied alternately and must be applied in the same direction. These actuating forces have then to be taken up by a support bearing arranged on the crankshaft or in the transmission. The forces resulting in such an arrangement can be seen in the diagram shown in FIG. 8. In this diagram, the partial clutch K1 is at first open, and the partial clutch K2 is at first closed. The total actuating force is therefore equal to the actuating force of the partial clutch K2. An overlapping shifting is then executed to close the partial clutch K1 and open the partial clutch K2. Accordingly, the actuating force of the partial clutch K1 increases and the actuating force of the partial clutch K2 decreases. The total actuating force, however, remains substantially unchanged. In the final state, the partial clutch K1 is closed and the partial clutch K2 is open. The total actuating force corresponds to the actuating force of the partial clutch K1. As can be seen in this diagram, the total actuating force remains substantially at the same level over the entire period of time.

According to the arrangement in an alternative embodi-ment of the dual clutch, the partial clutch K1 is closed in the normal state ("normally closed") and is pressed open through at least one actuating device, while the partial clutch K2 is open in the normal state ("normally open") and is pressed to close through at least one actuating device. Two different states result in such an arrangement: when the partial clutch K1 is closed and the partial clutch K2 is open, no actuating force is required. In contrast, to open the partial clutch K1 and close the partial clutch K2, two actuating forces are needed. In this case, the two actuating forces add up and produce a high axial force on the support bearing.

The forces resulting in such an arrangement can be seen in the diagram shown in FIG. 9. In this diagram, the partial clutch K1 is at first open, and the partial clutch K2 is at first closed. The total actuating force is therefore equal to the sum of the opening force of the partial clutch K1 and the closing force of the partial clutch K2. An overlapping shifting is then performed to close the partial clutch K1 and open the partial clutch K2. Accordingly, the actuating force of the partial clutch K1 is reduced to almost zero. In the final state, the partial clutch K1 is closed and the partial clutch K2 is open. The total actuating force again corresponds to the sum of the actuating forces of the partial clutches K1 and K2.

In case of use in trucks which can have a torque of up to 3300 to 3500 Nm, release forces of up to 12400 to 15000 N are produced. If it is desired to use a dual clutch in trucks, the crankshaft mounting or the transmission bearing of the arrangement described above would have to support twice the actuating force. Therefore, to avoid such a design of the mounting arrangement and also all concomitant modifica-tions to the housing, it is desirable to minimize the sum of the two actuating forces.

SUMMARY OF THE INVENTION

It is an object of the present invention to modify the exist-ing dual clutch design for use in trucks in such a way that clearly higher torques can be transmitted.

This object is achieved according to the invention through a dual clutch comprising a first partial clutch through which a drive shaft of a drive can be connected to a first transmission input shaft of a transmission, a second partial clutch through which the drive shaft of the drive can be connected to a second transmission input shaft of the transmission, and an actuating device, wherein the first partial clutch K1 is closed in its non-actuated state ("normally closed") and for opening this first partial clutch K1, a tensile force is applied ("pull-type clutch"), and wherein the second partial clutch K2 is open in its non-actuated state ("normally open") and for closing this second partial clutch, a pressure force is applied ("push-type clutch"), so that the actuating force of the first partial clutch K1 acts in opposition to the actuating force of the second partial clutch K2. Accordingly, during an overlapping shift of the partial clutches when gears are shifted, a quasi neutral-ization of the action of the actuating force on the mounting of the dual clutch occurs. As represented in FIG. 10, through the inventive clutch comprising an association of a pressed-closed "normally open" clutch and a pulled-open, "normally closed" clutch, the sum of the two actuating forces, pressed in one case and simultaneously pulled in the other, is almost zero.

The aforesaid object is likewise achieved through a dual clutch comprising a first partial clutch K1 through which a drive shaft of a drive can be connected to a first transmission input shaft of a transmission, a second partial clutch K2 through which the drive shaft of the drive can be connected to a second transmission input shaft of the transmission and an actuating device, wherein the actuating device comprises two pneumatically actuated partial actuating devices, each of which is intended for actuating one of the two partial clutches.

Preferably, the actuating device comprises two (pressure) cylinders, wherein one of the (pressure) cylinders is intended to act as a partial actuating device of the first partial clutch K1 for providing a tensile force and a second (pressure) cylinder is intended to act as a partial actuating device of the second partial clutch K2 for providing a pressure force for actuating a respective one of the partial clutches.

Each of the partial actuating devices can comprise two pressure chambers separated from each other.

The above object is likewise achieved, in particular in connection with the forms of embodiment described above, through a dual clutch comprising a disk flywheel which is firmly connected to a drive shaft of a drive, wherein the dual clutch further comprises a central plate as a counter pressure plate for the pressure plates of the partial clutches, said central plate being fixed to the disk flywheel and the dual clutch being mounted exclusively through the fixation of the disk flywheel.

The above object is further likewise achieved, in particular in connection with the embodiment described above, through a dual clutch comprising a first partial clutch through which a drive shaft of a drive can be connected to a first transmission input shaft of a transmission, a second partial clutch through which the drive shaft of the drive can be connected to a second transmission input shaft of the transmission, wherein the dual clutch comprises a central plate as a counter pressure plate for the pressure plates (contact pressure plates) of the partial clutches, and wherein the pressure plates of both the partial clutches are fixed directly to the central plate through leaf springs, particularly in connection with riveted joints.

The aforesaid object of the invention is likewise achieved through a dual clutch comprising a disk flywheel (with or without vibration damping), a first partial clutch K1 comprising a clutch plate, a pressure plate, a lever element (configured in the present case as a Belleville washer) and a clutch cover for supporting the lever element through which first partial clutch, a drive shaft of a drive can be connected to a first transmission input shaft of a transmission, the dual clutch further comprising a second partial clutch K2 comprising a clutch plate, a pressure plate, a lever element and a clutch cover for supporting the lever element through which second partial clutch, the drive shaft of the drive can be connected to a second transmission input shaft of the transmission, wherein the dual clutch comprises a central plate as a counter pressure plate for the pressure plates of the partial clutches and wherein the clutch cover of the partial clutch K1 and/or of the clutch cover of the partial clutch K2 are fixed through screws and centered through spacers such as spacing tubes or cast toes and wherein these screws are loaded solely through tension. Accordingly, a loading of the screws in peripheral direction of the clutches can be avoided.

The aforesaid object is likewise achieved through a dual clutch comprising a disk flywheel (with or without vibration damping), a first partial clutch K1 comprising a clutch plate, a pressure plate, a lever element (configured in the present case as a Belleville washer) and a clutch cover for supporting the lever element through which first partial clutch, a drive shaft of a drive can be connected to a first transmission input shaft, the dual clutch further comprising a second partial clutch K2 comprising a clutch plate, a pressure plate a lever element and a clutch cover for supporting the lever element through which second partial clutch, the drive shaft of the drive can be connected to a second transmission input shaft of the drive, wherein the dual clutch comprises a central plate as a counter pressure plate for the pressure plates of the partial clutches and wherein the dual clutch comprises screw connections I comprising spacers (such as spacing tubes or cast toes) for fixing the clutch cover of the partial clutch K2 to the central plate and wherein the spacers are arranged between the clutch cover of the partial clutch K2 and the central plate for setting a defined distance between the clutch cover of the partial clutch K2 and the central plate, and wherein the central plate comprises through-openings through which the screws of the screw connections extend for being screwed to the flywheel.

In a preferred example of embodiment, the dual clutch also comprises further screw connections II comprising spacers for fixing the clutch cover of the partial clutch K1 to the pressure plate of the partial clutch K1, wherein spacers are arranged between the clutch cover of the partial clutch K1 and the pressure plate of the partial clutch K1 for setting a defined distance between the clutch cover of the partial clutch K1 and the pressure plate of the partial clutch K1 and wherein the screws of the screw connections are screwed to the pressure plate of the partial clutch K1.

In a further preferred example of embodiment, the central plate is screwed without spacers to the disk flywheel through further screw connections III.

Furthermore, the screws of all the aforesaid types of screw connections can be biased in accordance with the clutch actuating force required for torque transmission.

BRIEF DESCRIPTION OF THE DRAWINGS

The present invention is described more closely in the following with reference to preferred examples of embodiment and the appended figures which show.

DETAILED DESCRIPTION OF THE INVENTION

The present examples of embodiment relate to a dual clutch configured particularly for trucks. The dual clutch is arranged in the drive train of a vehicle between a drive and a dual clutch transmission, wherein it is possible to arrange a torsion damping element such as a dual mass flywheel between the drive and the dual clutch.

The dual clutch structure 1 comprises a first partial clutch K1 which is closed in the normal state ("normally closed"), wherein the lever mechanism of this partial clutch K1 is configured such that this first partial clutch K1 is loaded through a tensile force $F_{K1}$ for opening, and further comprises a second partial clutch K2 which is open in the normal state ("normally open"), wherein the lever mechanism of this partial clutch K2 is configured such that this partial clutch is loaded through a pressure force $F_{K2}$ for closing. One of the partial clutches K1 and K2 can comprise a wear compensation device. It is equally possible for both partial clutches K1 and K2 to comprise a wear compensation device.

Figure 1:
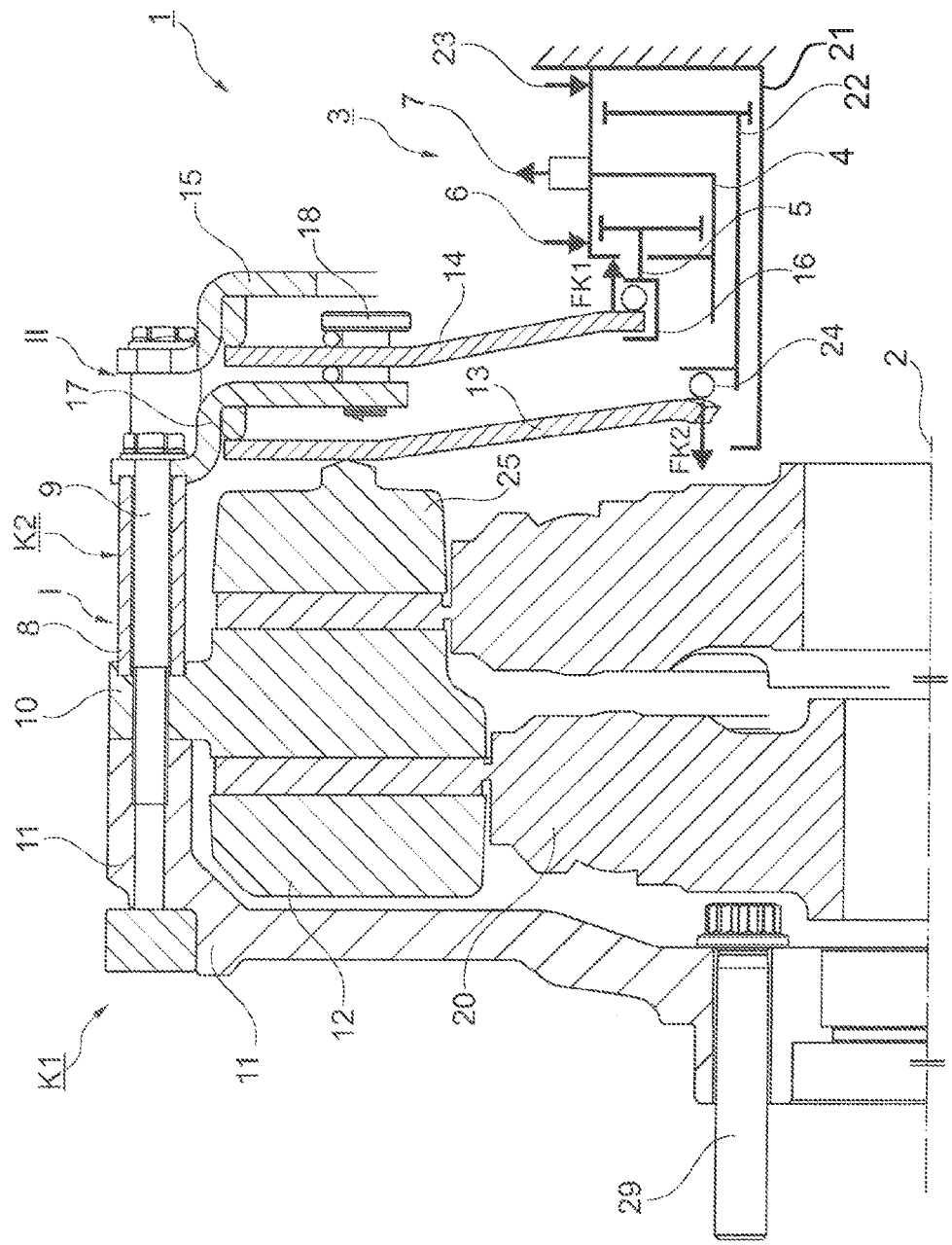
FIG. 1 a schematic representation of the structure of one example of embodiment of the dual clutch, in a semi-sectional view, FIG. 2 a perspective representation of the dual clutch in assembled state, without the actuating device, FIG. 3 a sectional view of the dual clutch in the region of fixation of the cover of the partial clutch K2, in a semi-sectional view, FIG. 4 a sectional view of the dual clutch in the region of fixation of the cover of the partial clutch K1, in a semi-sectional view, FIG. 5 a sectional view of the dual clutch in the region of fixation of the central plate to the flywheel, in a semi-sectional view, FIG. 6 a sectional view of the dual clutch in the region of the connection between the pressure plates and the central plate through riveted leaf spring assemblies.

The structure is best shown in FIG. 1. The actuating forces (tensile force $F_{K1}$ of the partial clutch K1 and the pressure force $F_{K2}$ of the partial clutch K2) are produced by an actuating means 3 which is arranged centrally relative to an axis of rotation 2 and is loaded in the present case pneumatically.

This actuating means 3 comprises a first cylinder 4 comprising an actuating piston 5 and pressure chambers separated from each other by this actuating piston 5, one of the pressure chambers being able to be connected to a compressed air duct 6 and the respective other pressure chamber being able to be connected to an air outlet 7. The air outlet 7 can be able to be loaded through the surroundings or through another reservoir or even through the compressed air duct if, at the same time, the previous air inlet is connected to the surroundings, so that a more rapid actuation could be achieved by reason of reversal of the pressure level.

Figure 2:
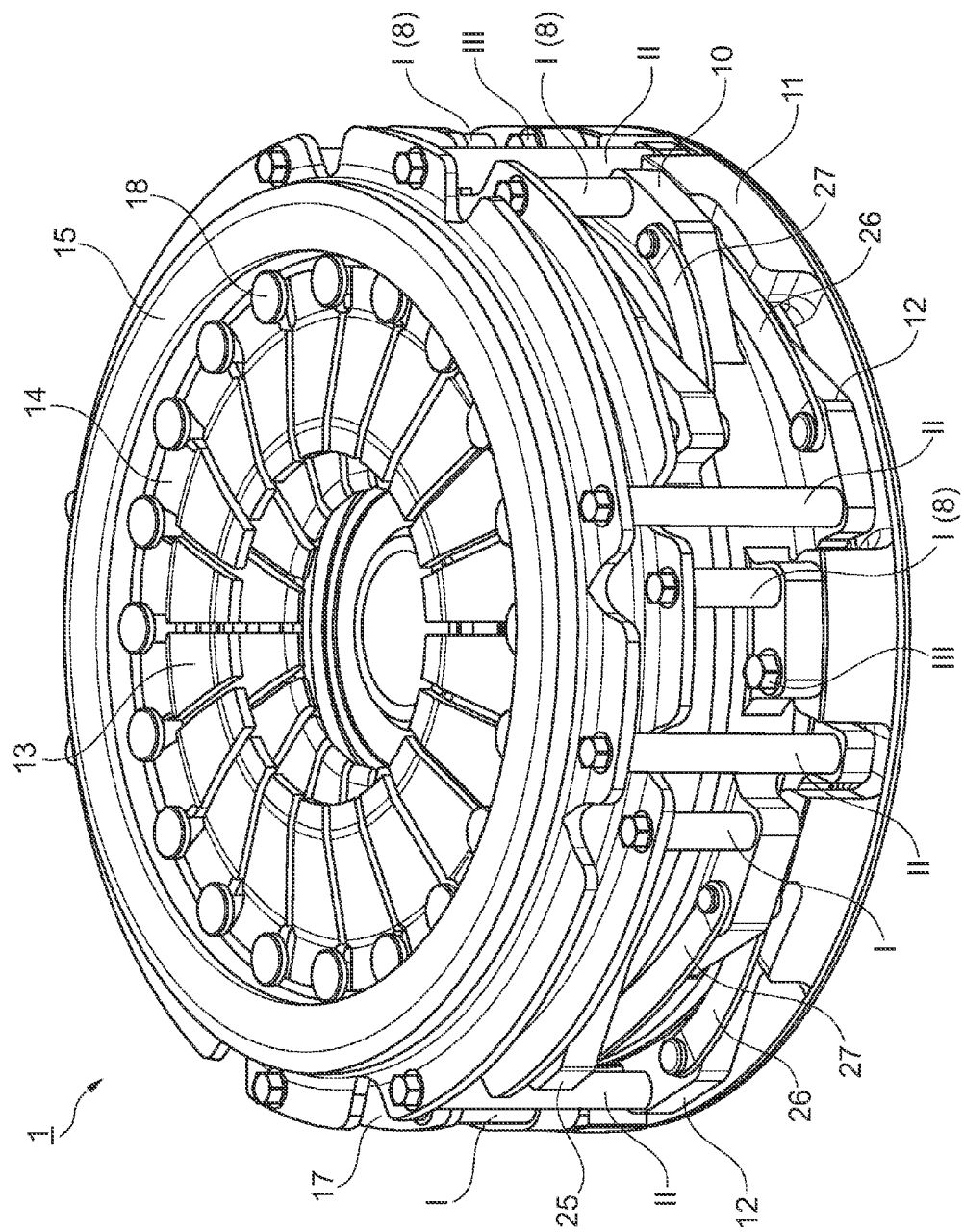

As shown in FIGS. 1 and 2, screw connections II comprise spacers and screws, the screws of the screw connection II being screwed to the pressure plate 12 of the partial clutch K1, and the spacers in the form of spacing tubes being clamped between the pressure plate 12 and the cover 15.

The structure of a first cylinder 4 of the actuating means 3 is such that a tensile force $F_{K1}$ is applied to the Belleville washer 14 of the partial clutch K1 through an actuating bearing (release bearing) 16, i.e. the actuating bearing 16 imparts this tensile force $F_{K1}$ to the lever spring 14 which is supported on the cover 15. An outer end of the lever spring 14 (Belleville washer 14) is mounted on the cover K1. A central region of the lever spring 14 is supported on the cover 17 of partial clutch 17. When a tensile force $F_{K1}$ is produced in the first partial actuating device 4, 5, the lever spring 14 (which can be configured, for instance, as a Belleville washer) is pivoted about the support 18 and the contact surface between the lever spring 14 and the release bearing 16 in FIG. 1 is displaced towards the right, so that the cover 15 (through the screw connection II) in FIG. 1 is displaced towards the left and the pressure plate 12, due to the action of the Belleville washer elements is likewise displaced towards the left in FIG. 1, so that a clamping of the coupling plate 20 is neutralized. The clutch K1 which is closed in the normal state is now open due to the tensile force $F_{K1}$.

The actuating means 3 additionally comprises a second partial actuating device which is likewise configured as a cylinder 21 comprising a piston 22 and two pressure chambers that are separated from each other through the piston 22, one of the pressure chambers, again, being able to be connected to a compressed air duct 23 and another one of the pressure chambers being able to be connected to an outlet 7, these connections (identically to the first partial actuating device 4, 5) also being able to be configured in the form of a multi-directional valve (particularly three-way valve), one of the ways being able to be connected to the compressed air duct and the other two ways to the respective pressure chambers.

The second cylinder 21 is configured such that a pressure force $F_{K2}$ is produced and imparted via the actuating bearing 24 (engaging bearing) to the lever spring 13. The outer region of the lever spring 13 is supported on the cover 17 of the partial clutch K2, which cover is supported through the spacers 8 of the screw connections I on the central plate 10 and fixed through the screws 9 of the screw connection I to the disk flywheel 11.

Thus, the cover 17 is supported through the spacers 8 of the screw connection I on the central plate 10 and fixed through the screws 9 of the screw connection I to the disk flywheel 11, i.e. the screws 9 of the screw connection extend through through-openings in the central plate 10 and are screwed to the disk flywheel 11. The spacers 8 are configured as spacing tubes, and the screws 9 are received in these spacing tubes.

FIG. 2 shows the dual clutch 1 in an assembled state.

FIG. 2 particularly shows the connection of the cover 17 of the partial clutch K2 to the central plate 10 and the fixation of the central plate 10 to the disk flywheel 11, both being realized through the screw connection I with spacer 8.

Figure 3:
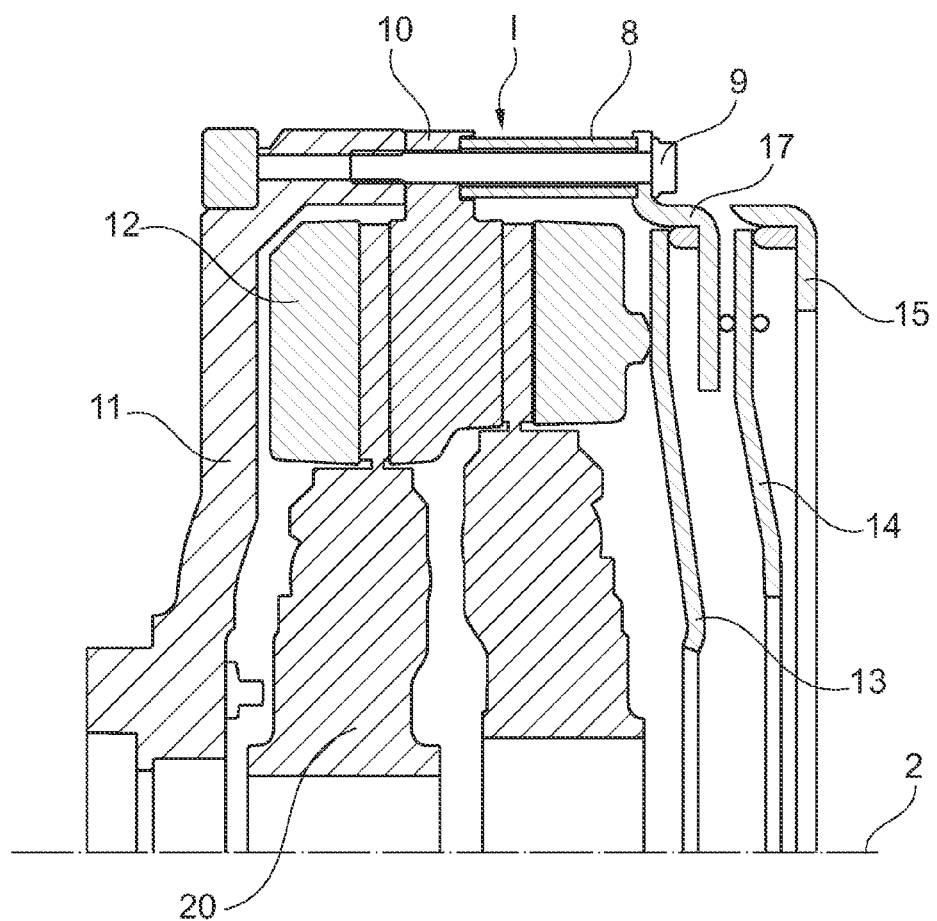
Figure 4:
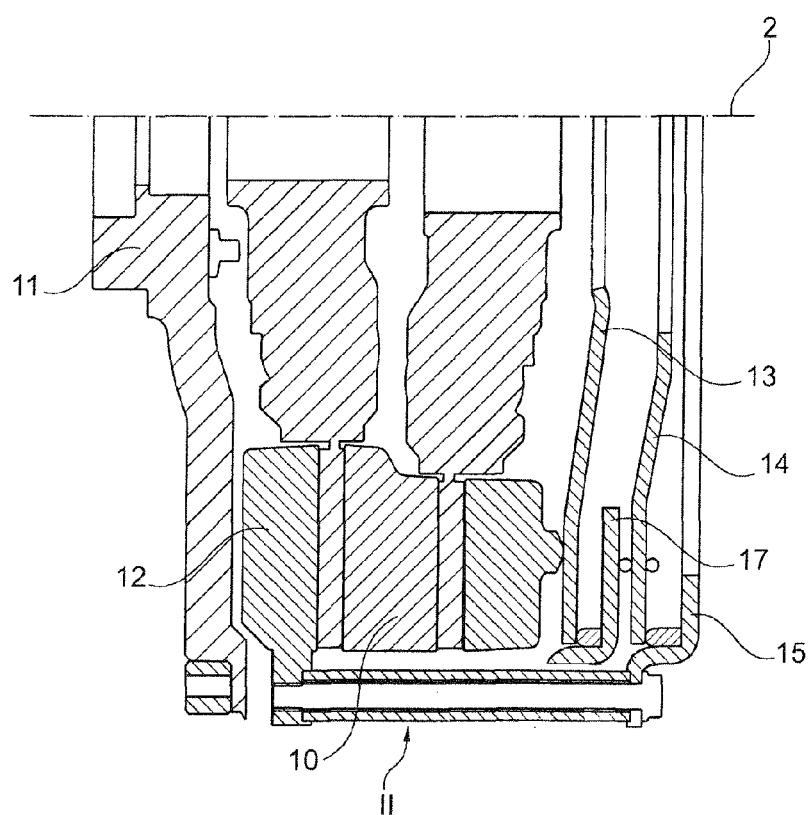

FIG. 3 shows a schematic representation of the dual clutch 1 in a sectional view in the region of the screw connection I between the cover 17 of the partial clutch K2 and the central plate 10 as also the disk flywheel 11. FIG. 4 shows a sectional view in the region of the connection between the cover 15 of the partial clutch K1 and the pressure plate (contact pressure plate) 12 of the partial clutch K1 through screw connections II.

FIG. 4 shows the connection of the cover 15 of the partial clutch K1 to the pressure plate 12 of the partial clutch K1 through the screw connections II, the partial clutch K1 being loaded only through tension.

Figure 5:
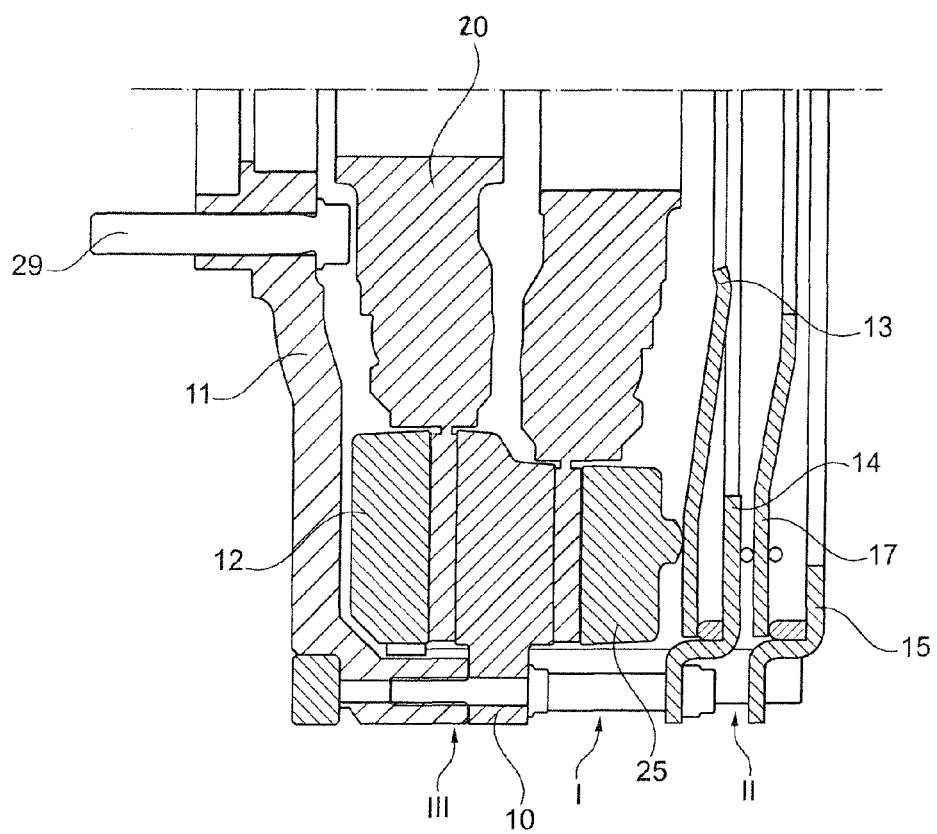

FIG. 5 shows a sectional representation of the dual clutch 1 in the region of the screw connections III between the central plate 10 and the disk flywheel 11 and, thus also, the centering of the center plate and the fixing of the central plate on the disk flywheel.

Figure 6:
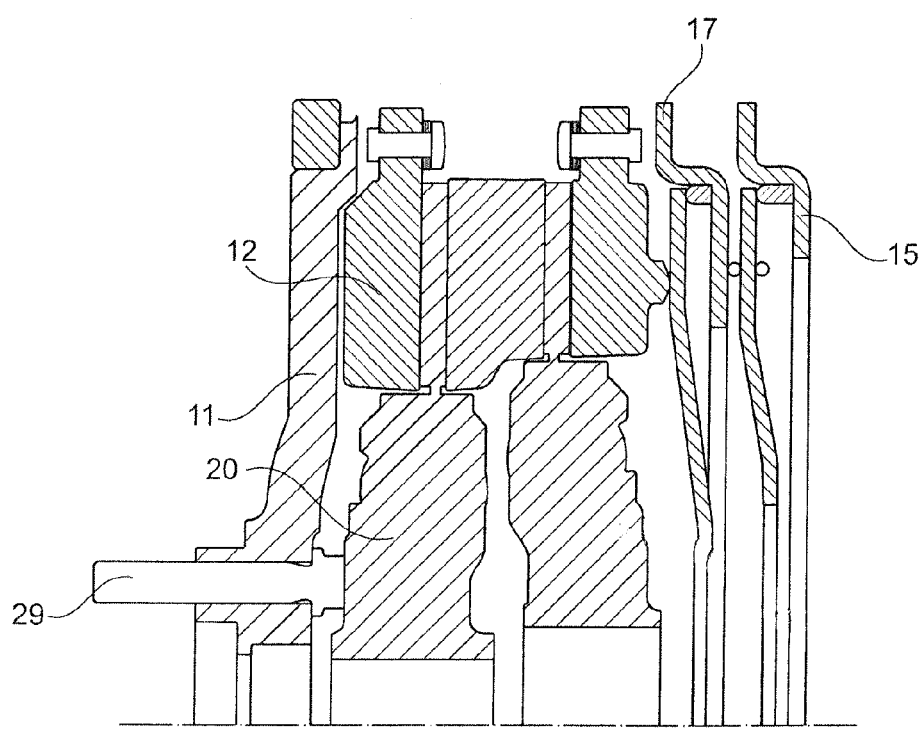
Figure 7:
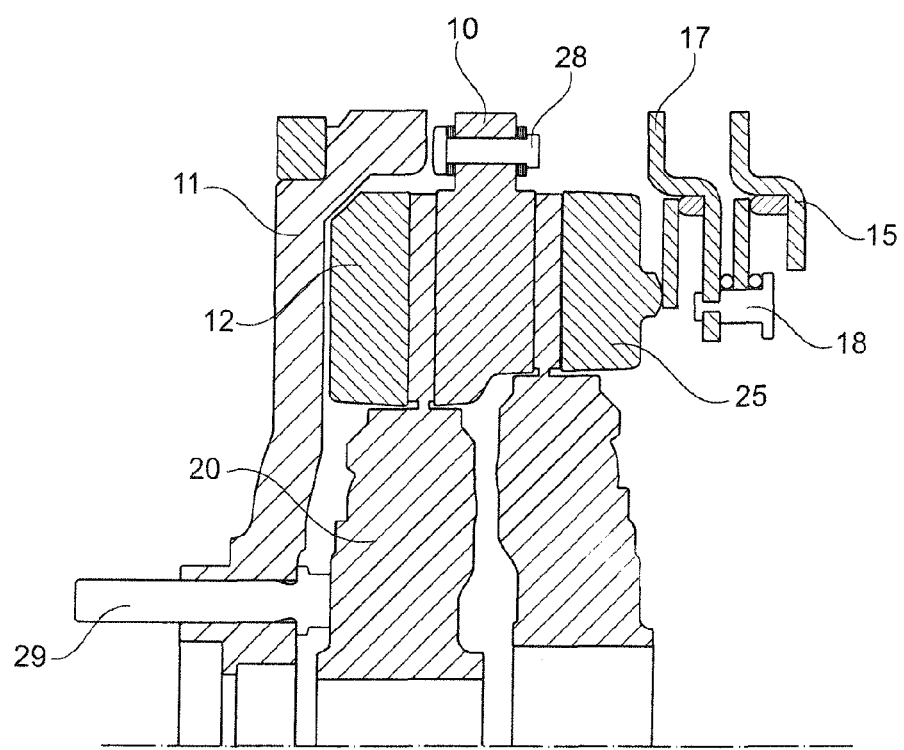
FIG. 7 a further sectional view of the dual clutch in the region of the connection of the leaf spring assemblies to the central plate, FIG. 8 a pattern of the actuating forces in a prior art dual clutch arrangement during an overlapping shift, FIG. 9 a pattern of the actuating forces in a further prior art dual clutch arrangement during an overlapping shift, FIG. 10 a pattern of the actuating forces in the present dual clutch arrangement during an overlapping shift.
Figure 8:
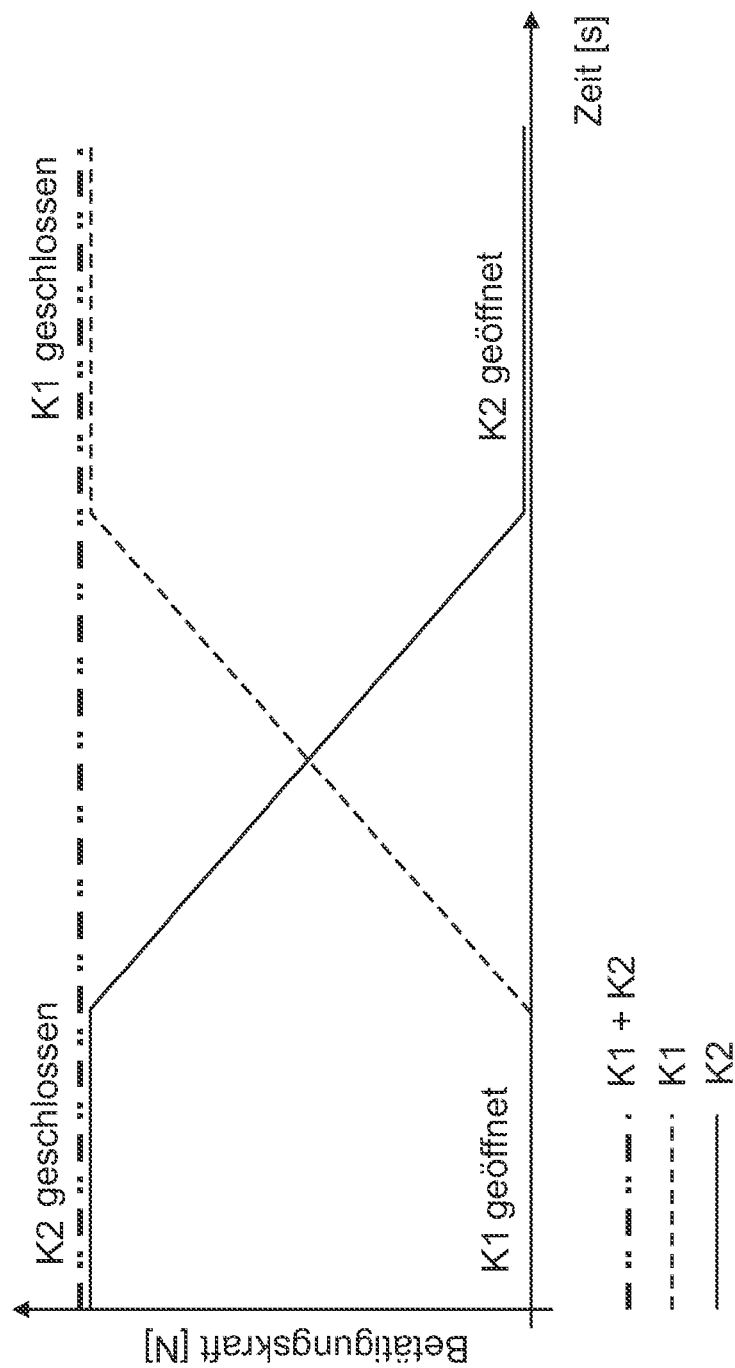
Figure 9:
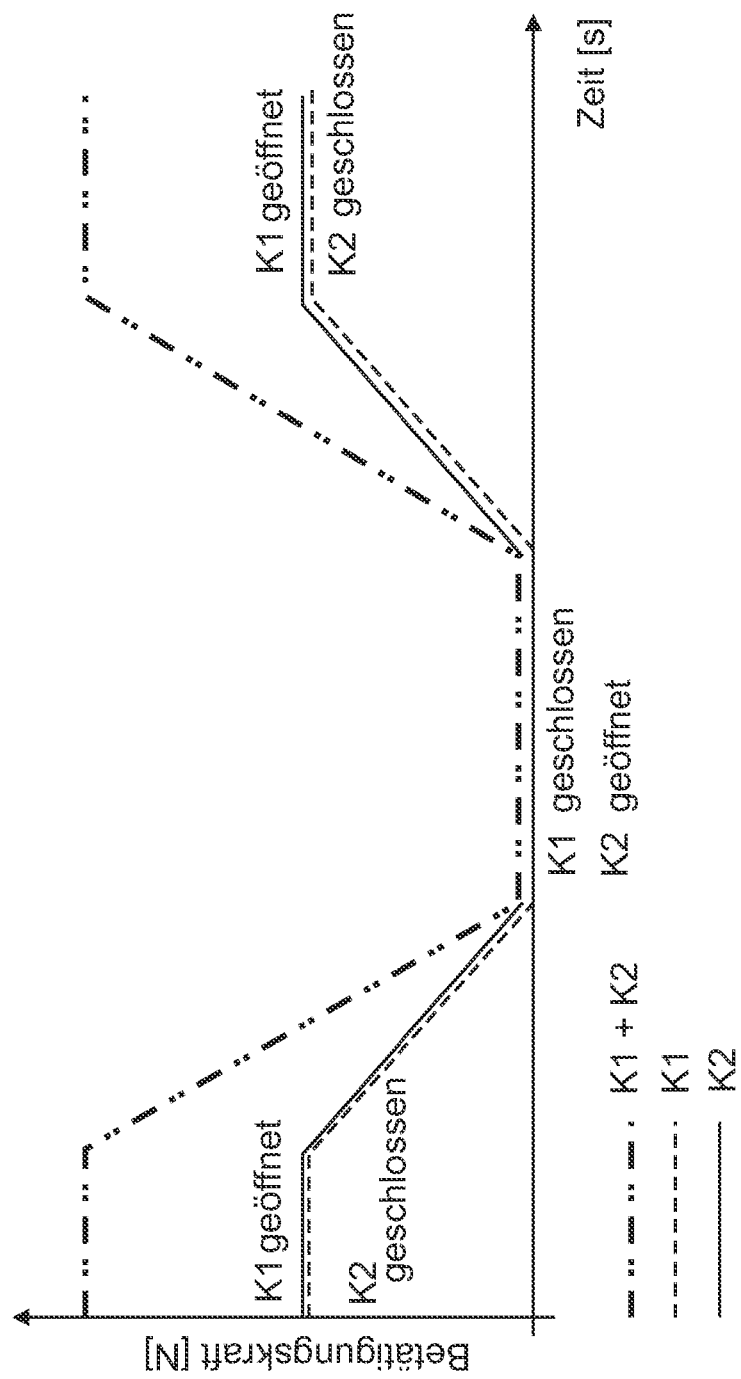

FIGS. 6 and 7 show riveted joints which connect the two pressure plates 12, 25 of the partial clutches K1 and K2, respectively, to the common central plate 10 through leaf spring assemblies 26, 27. These leaf spring assemblies 26, 27 are arranged at corresponding positions on different sides of the central plate 10. As can be seen in FIG. 7, the leaf spring assemblies 26, 27 situated opposite each other are connected at their respective other ends through a common riveted joint 28 to the central plate 10.

By reason of this configuration of the leaf spring connection 28, torque transmission between the contact pressure plates 12, 25 of the clutches K1 and K2 is effected solely through the leaf spring connection to the intermediate plate 10.

As illustrated, the covers 15, 17 of the partial clutches K1 and K2 are fixed through screws and centered and spaced through spacing tubes, so that the screws are only loaded by a tensile force and do not have to transmit a torque. These spacing tubes may also be replaced with cast toes on the central plate.

As illustrated, the dual clutch 1 is screwed to the flywheel 11 and is supported solely on the crankshaft mounting 29.

As illustrated further, the actuating device 3 of the dual clutch 1 comprises a central release device and a central engaging device, both of which are actuated either pneumatically or hydraulically. By reason of the force directions chosen, the actuating forces of the clutch K1 and the actuating forces of the clutch K2 are opposed to each other, so that no axial force is transmitted to the crankshaft.

As illustrated still further, the partial clutch K1 is closed in the normal state and has to be pulled to be opened, and the partial clutch K2 is open in the normal state and has to be pressed to be closed, so that, again, the actuating forces K1 and K2 counteract each other and an axial force on the crankshaft can be avoided.

The above description discloses, among other things, that the two actuating forces of a dual clutch, i.e. the actuating force of the pressed-closed, "normally open" clutch and the actuating force of the pulled, "normally closed" clutch neutralize each other, so that the sum of the two actuating forces is almost zero and an oversize of the crankshaft bearing or of the transmission bearing is not required.

The above description particularly discloses that the partial clutch K1 is configured to be closed ("normally closed") in the normal state, and a tensile force has to be applied to open it ("pulled") and that, at the same time, the partial clutch K2 is configured to be open ("normally open") in the normal state and a pressure force has to be applied to close it ("pressed-closed").

Figure 10:
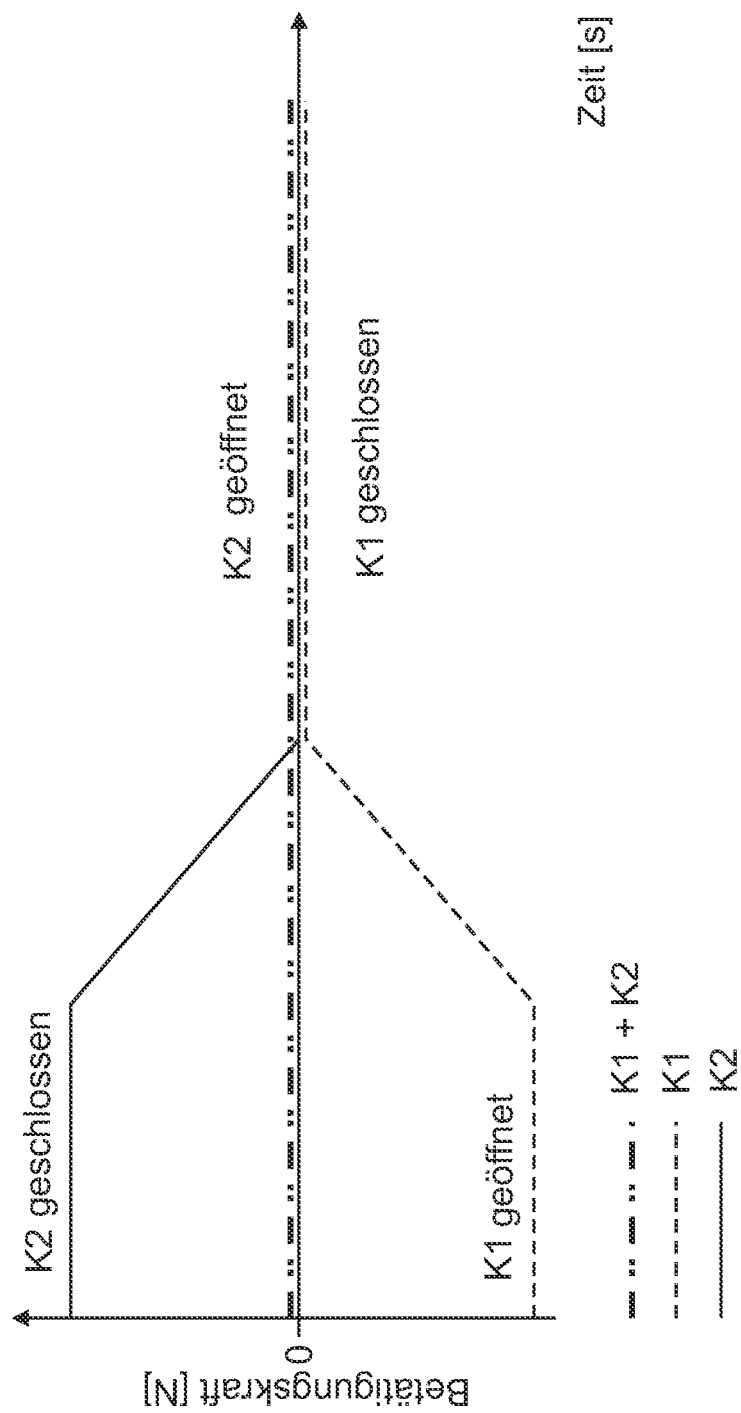

FIG. 10 shows a diagram that shows the pattern of the actuating forces in the present dual clutch during an overlapping shift. During this shift, the partial clutch K1 is at first open and the partial clutch K2 is at first closed, the actuating forces of the partial clutches K1 and K2 being oppositely directed. The total actuating force is therefore almost zero. Following this, an overlapping shift is executed in order to close the partial clutch K1 and open the partial clutch K2. Accordingly, the actuating force of the partial clutches K1 increases and the actuating force of the partial clutch K2 decreases. The total actuating force therefore remains substantially equal to zero. In the final state, the partial clutch K1 is closed and the partial clutch K2 is open.

To open the partial clutch K1 in this arrangement, the Belleville washer has to be pulled. To simultaneously close the partial clutch K2, the lever spring has to be pressed. This means that the actuating forces act in opposite directions and the sum of the two is almost zero. Thus, also, no axial force action results on the crankshaft.

A further particular advantage of the presently described dual clutch is that the partial clutch K1 closes through the force of its own Belleville washer and that the partial clutches K2 opens through the force of its own leaf spring.

The above description also discloses a central pneumatic dual release device, one cylinder being provided for pressing the partial clutch K2 and another cylinder for pulling the partial clutch K1, both these cylinders being arranged in axial direction.

The above description further discloses that the dual clutch is screwed to the flywheel and supported solely on the crankshaft mounting. Torque transmission is effected through leaf springs only between the contact pressure plate of the partial clutch K1 and the intermediate plate, and between the contact pressure plate of the partial clutch K2 and the intermediate plate.

The above description discloses still further that the covers of the partial clutches K1 and K2 are fixed through screws and centered through spacing tubes. These screws are loaded only by a tensile force, so that no torque transmission occurs. The spacing tubes may also be replaced with cast toes on the central plate.

LIST OF REFERENCE NUMERALS

1 Dual clutch
2 Axis of rotation
3 Actuating means
4 Cylinder
5 Actuating piston
6 Compressed air duct
7 Air outlet
8 Spacers
9 Screws
10 Central plate
11 Disk flywheel
12 Pressure plate
13 Lever spring
14 Belleville washer
15 Cover
16 Actuating bearing
17 Cover
18 Support
20 Clutch plate
21 Cylinder
22 Piston
23 Compressed air duct
25 Pressure plates
26 Leaf spring assembly
27 Leaf spring assembly
28 Riveted joint
29 Crankshaft mounting
$F_{K1}$ Tensile force
$F_{K2}$ Pressure force
K1 First partial clutch
K2 Second partial clutch

The invention claimed is:

1. A dual clutch for selectively connecting a drive shaft to a first transmission input shaft and a second transmission input shaft of a transmission, comprising:
a first partial clutch having a first lever element;
a second partial clutch having a second lever element; and
an actuating device,
wherein the first partial clutch is closed in a non-actuated state and for opening the first partial clutch, a tensile force is applied by the actuating device to the first lever element, and the second partial clutch is open in a non-actuated state and for closing the second partial clutch, a pressure force is applied by the actuating device to the second lever element, so that the tensile force used to actuate the first partial clutch is in opposition to the pressure force used to actuate the second partial clutch,
the actuating device having two hydraulic or pneumatic cylinders including a first cylinder and a second cylinder arranged in a common housing, the first cylinder providing the tensile force to actuate the first partial clutch, and the second cylinder providing the pressure force to actuate the second partial clutch, whereby the tensile force exerted by the actuating device to open the first partial clutch and the pressure force exerted by the actuating device to close the second partial clutch are oppositely directed and neutralize each other so that no axial force is transmitted to the drive shaft,
wherein each of the first cylinder and the second cylinder has two pressure chambers that are separated from each other, a first pressure chamber of the first cylinder connected to a first pressurized source and a first pressure chamber of the second cylinder being connected to a second pressurized source, a second pressure chamber of each of the first cylinder and the second cylinder being connected to a common outlet.

2. The dual clutch according to claim 1, further comprising:
a disk flywheel which is firmly connected to the drive shaft; and
a central plate,
the first and second partial clutches having pressure plates and the central plate acting as a counter pressure plate for the pressure plates of the first and second partial clutches, the central plate being fixed to the flywheel disk and with the double clutch being mounted exclusively by fixation of the flywheel disk to the drive shaft.

3. The dual clutch according to claim 1, further comprising:
a central plate; and
a housing,
the first and second partial clutches having pressure plates and the central plate acting as a counter pressure plate for the pressure plates of the component clutches,
the pressure plates of both of the first and second partial clutches are fixed directly to the central plate or to the housing through leaf springs in connection with riveted joints.

4. A dual clutch according to claim 1, further comprising:
a disk flywheel with or without vibration damping, the first partial clutch having a first clutch plate, a first pressure plate, the first lever element and a first clutch cover for supporting the first lever element, and the second partial clutch having a second clutch plate, a second pressure plate, the second lever element and a second clutch cover for supporting the second lever element;

spacers centering the clutch cover of the first partial clutch and/or the clutch cover of the second partial clutch; and screws fixing the clutch cover of the first partial clutch and/or the clutch cover of the second partial clutch.

5. The dual clutch according to claim 4, wherein the spacers are spacing tubes or cast toes.

6. The dual clutch according to claim 4, wherein the screws are loaded solely by a tensile force.

7. The dual clutch according to claim 4, further comprising a central plate, wherein the screws fix the clutch cover of the second partial clutch to the central plate, the spacers are arranged between the clutch cover of the second partial clutch and the central plate for setting a defined spacing between the clutch cover of the second partial clutch and the central plate, and the central plate has through-openings through which the screws extend, and the screws are screwed to the flywheel.

8. The dual clutch according to claim 4, further comprising a central plate, wherein the screws fix the clutch cover of the first partial clutch to the pressure plate of the first partial clutch, the spacers which set a defined spacing between the clutch cover of the first partial clutch and the pressure plate, are arranged between the clutch cover of the first partial clutch and the pressure plate, and the screws are screwed to the pressure plate of the first partial clutch.

9. The dual clutch according to claim 1, comprising:

a disk flywheel with or without vibration damping, the first partial clutch having a first clutch plate, a first pressure plate, and a first clutch cover for supporting the first lever element, and the second partial clutch having a second clutch plate, a second pressure plate, and a second clutch cover for supporting the second lever element;

a central plate; and screws fixing the clutch cover of the first partial clutch and/or the clutch cover of the second partial clutch, wherein the central plate is screwed to the disk flywheel by the screws.

10. The dual clutch according to claim 9, wherein the screws are biased in accordance with a clutch actuating force required for torque transmission.

11. The dual clutch according to claim 1, wherein the common housing surrounds an axis of rotation of the dual clutch.

12. The dual clutch according to claim 1, wherein the first cylinder and the second cylinder are nested with respect to each other.

\* \* \* \* \*